March 2, 1971     V. HOPKINS ET AL     3,567,504
POLYIMIDE BONDED SOLID LUBRICANT BEARING SURFACE
Filed June 19, 1967
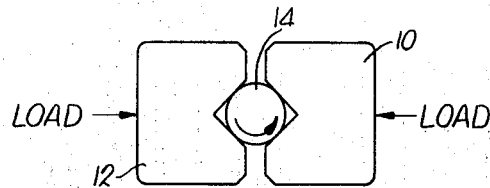
Fig.1.
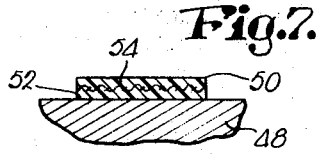
Fig.7.
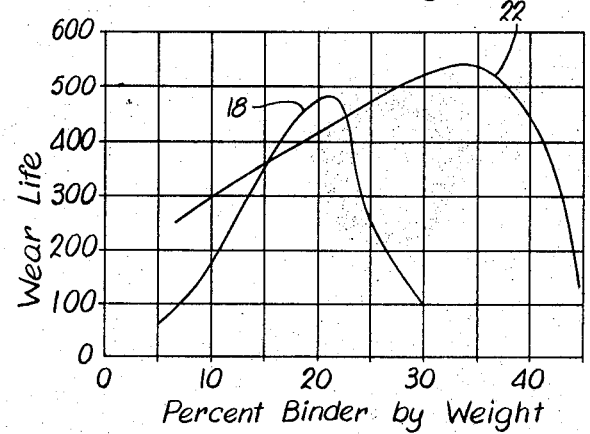
Fig.2.
Fig.3.
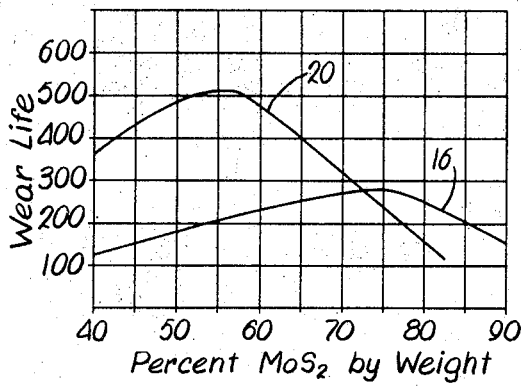
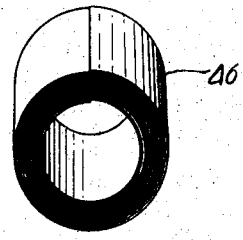
Fig.5.
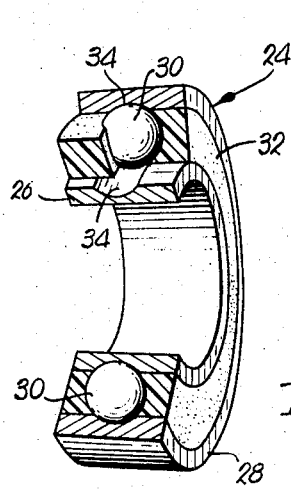
Fig.6.
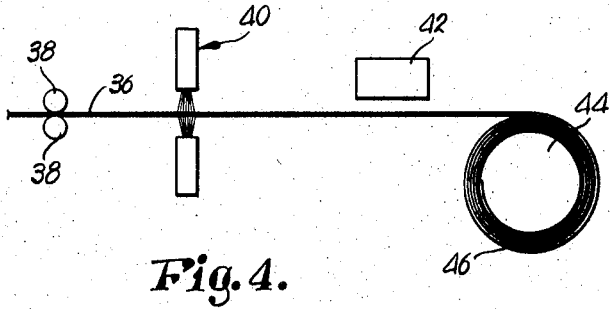
Fig.4.
INVENTORS.
Vernice Hopkins
Mahlon E. Campbell
Keith E. Demorest
BY Schmidt, Johnson, Hovey,
Williams & Bradley.
ATTORNEYS.

United States Patent Office 3,567,504
Patented Mar. 2, 1971

3,567,504
POLYIMIDE BONDED SOLID LUBRICANT
BEARING SURFACE
Vernice Hopkins, Overland Park, and Mahlon E. Campbell, Merriam, Kans., and Keith E. Demorest, Huntsville, Ala.; said Demorest assignor to the United States of America as represented by the Administrator of the National Aeronautics and Space Administration, said Hopkins and Campbell assignors to Midwest Research Institute, Kansas City, Mo.
Filed June 19, 1967, Ser. No. 647,007
Int. Cl. C10m 7/00; F16c 13/02, 19/00
U.S. Cl. 117—160                        16 Claims

ABSTRACT OF THE DISCLOSURE

A solid lubricant film coating composition is produced by admixing a finely divided solid lubricant material comprising a mixture of molybdenum disulfide ($MoS_2$) and antimony trioxide ($Sb_2O_3$) into a solution of a poly-pyromellitamic acid and a solvent therefor. In particular, the acid is derived from the reaction between pyromellitic dianhydride (PMDA) and either 4,4'-diaminodiphenyl ether (DADPE) or 4,4'-methylene dianiline (MDA). The solvent for the MDA acid is diethylene acidimide while the solvent for the DADPE acid is a three to one volume ratio of oxylene and pyrrolodine. Optimum results are obtained with MDA acid by using a 3 to 1 ratio of $MoS_2$ to $Sb_2O_3$ in the lubricant material and a 79 to 21 ratio of lubricant material to MDA acid (solids) in the admixture. Also, optimum results are obtained with DADPE acid by using a 55 to 45 ratio of $MoS_2$ to $Sb_2O_3$ in the lubricant material and a 66 to 34 ratio of lubricant material to DADPE (solids) in the admixture.

Either of the admixtures, after appropriate dilution, is sprayed onto a bearing surface of a bearing component in a layer approximately 0.0005 inch thick. The layer is baked at approximately 200° F. to evaporate the solvent therefrom and then at about 575° F. to cure the film by causing the acid in the film to be converted to its corresponding polyimide by ring closure.

Fiber glass reinforced bearing components are formed utilizing the polyimide composition as a binder for the glass fibers as well as for the lubricant pigment. The fiber glass reinforced components have solid lubricant characteristics as well as structural strength, and may be machined to form bearing sleeves or retainers.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to lubricants and particularly to organic bonded solid lubricants.

The wear-life of conventional organic (resin) bonded solid film lubricants at temperatures from approximately 70° F. to 400° F. is usually much superior to inorganic (silicate or ceramic) bonded solid film lubricants. However, at temperatures above 400° F. the wear-life of most conventional organic bonded lubricants drops rapidly with increasing temperature and few, if any, are satisfactory for use at temperatures above 500° F. Even though most inorganic bonded lubricants are superior to conventional organic bonded lubricants in wear-life characteristics at temperatures above 500° F., the wear-lives of such inorganic bonded lubricants are still quite short.

One of the basic reasons that most conventional organic bonded lubricants exhibit rapidly decreasing wear-life characteristics with increases in temperature above 400° F. to 500° F. is that the organic binder is thermally degradable and oxidizable at elevated temperatures. Another shortcoming of most conventional organic bonded lubricants is that the resin (or other organic material in the binder) generally includes relatively volatile components which tend to vaporize (or out-gas) at high vacuums to thereby cause the structural stability of the solid lubricant to be impaired.

Thus, it is an important object of the instant invention to provide an organic bonded solid film lubricant which is resistant to thermal degradation and oxidation at elevated temperatures.

Another important object of the invention is the provision of such a lubricant which is substantially devoid of relatively volatile components whereby the lubricant may be utilized in evacuated environments without failure caused by volatilization of such components.

As a corollary to the foregoing objects, it is an important aim of the invention to provide a lubricant as aforesaid which is particularly adaptable for handling in a liquified condition suitable for forming an adhesible film upon solidification whereby, upon application of a thin film of the liquified material to a bearing surface of a bearing component and after solidification of the film on the surface, the lubricated component is suitable for use under extremely adverse conditions of temperature and pressure and has long wear-life characteristics.

It is another object of the invention to provide a bearing component having both solid lubricant characteristics and structural strength.

Still another object of the invention is to provide a method for producing such a bearing component wherein the lubricating material is applied in a liquid form and is thereafter solidified to the end that production procedures are simplified. In this connection it is an important aim of the invention to utilize a lubricant material capable of undergoing chemical change upon heating so that the material may be applied in a liquified form and thereafter rendered substantially unliquifiable by thermal curing thereof.

In the drawing:

FIG. 1 is a schematic, top plan view of a Falex wear-life testing apparatus;

FIGS. 2 and 3 are graphs illustrating the relationship between various lubricant compositions and wear-life;

FIG. 4 is a schematic illustration of apparatus for producing bearing components;

FIG. 5 is a perspective view of a bearing component produced by the apparatus of FIG. 4;

FIG. 6 is a fragmentary, perspective view of a bearing assembly including bearing components embodying the concepts and principles of the invention; and FIG. 7 is a fragmentary, sectional view of a shaft provided with a solid lubricant sleeve.

Specifically, the present invention contemplates the use of polyimide bonded lubricants. Polyimides are produced by heating the corresponding polyamic acid to cause the same to undergo ring closure. Polyimides, in general, are resistive to thermal degradation and oxidation at elevated temperatures while the corresponding polyamic acids are generally readily soluble in solvents. Upon heating, the solvent is evaporated and then ring closure occurs to produce the polyimide, the latter being capable of tightly adhering to smooth substrates such as metal and glass and to lubricating pigments.

The basic nature and method of preparation of aromatic polyimides useful in accordance with the instant invention are described fully in an article entitled "Aromatic Polyimides," which was published in the Journal of Polymer Science, Part A, vol. 1, pp. 3135–3150 (1963).

This article is incorporated herein by reference as may be required for a full and complete understanding of such method of preparation. Thus, a further description of the method of preparation of polyimides is not believed necessary; however, in general, polyimides are produced by reacting dianhydrides, such as pyromellitic dianhydride (PMDA), with diamines to produce polyamic acids in accordance with the following equation:

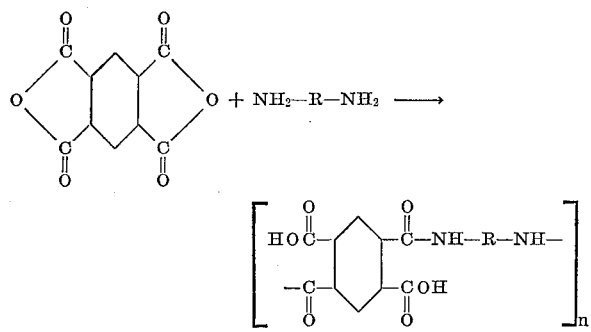

Upon heating, cyclization (ring closure) occurs with the formation of a polyimide:

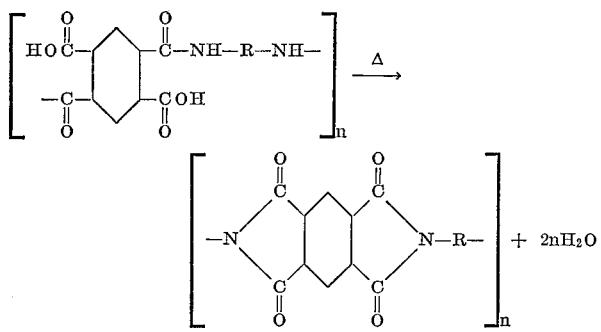

While PMDA is the preferred dianhydride, other aromatic dianhydrides could be utilized with equal results. Likewise, many aromatic diamines could be used, such as benzidine; 4,4'-diaminodiphenyl ether; 3,4'-diaminodiphenyl ether; 4,4'-diaminodiphenyl sulfide; 4,3'-diaminobenzanilide; 3,4' - diaminobenzanilide; 3,3' - diaminobenzanilide; N,N'-m-phenylene-bis(4-aminobenzamide); isophthal (3-aminoanilide); bis(4 - aminophenyl)isophthalate; m - phenylenediamine; 4,4' - methylenedianiline; 4,4'-diaminobenzanilide; and 4,4' - diaminophenyl benzoate; however, 4,4'-diaminodiphenyl ether (DADPE) and 4, 4'-methylenedianiline (MDA) are the preferred diamines. A polyamic acid produced by reacting PMDA and a diamine may be referred to generally as a polypromellitamic acid and the corresponding polyimide may be referred to as a polypromellitimide.

The polyamic acid produced by the reaction between PMDA and MDA will be referred to hereinafter as MDA acid while the polyamic acid produced by the reaction between PMDA and DADPE will be referred to as DADPE acid. Although a number of solvents would perform satisfactorily, it has been found that diethylene acidimide is preferred for MDA acid while a 3 to 1 volume ratio of xylene and pyrrolodine is preferred for DADPE acid. For purposes of standardization, each acid is mixed with its preferred solvent to form a heavy brown resin solution having a specific gravity of approximately 18 weight percent solids and will be hereinafter referred to as MDA resin. The DADPE acid resin solution should contain approximately 43 weight percent solids and will be referred to hereinafter as DADPE resin. The polyimde produced by heating MDA acid will be referred to hereinafter as MDA polyimide while the polyimide produced by heating DADPE acid will be referred to as DADPE polyimide.

The polyimides are utilized as binders for lubricant pigments, preferably a mixture of molybdenum disulfide ($MoS_2$) and antimony trioxide ($Sb_2O_3$), or soft metal powders, or a finely ground tetrafluoroethylene resin (Teflon), tungsten disulfide, or molybdenum disulfide. Of the soft metal powders, which have superior heat transfer characteristics and increase the structural flexibility and ductility of the lubricant material, gold is preferred. Additionally, silver, lead, tin, indium, copper, bismuth, and antimony may be used. Other suitable pigments include finely ground graphite, antimony trioxide, and molybdenum diselinide.

In formulating the lubricant material, $MoS_2$ was selected because of its good lubricant properties; $Sb_2O_3$ was selected because it was desirable that the film have corrosion resistant properties. It was found that $Sb_2O_3$ enhanced the wear-life of $MoS_2$ type resin bonded solid film lubricants. A leveling agent, in small quantities, was also included in this formulation work to produce a smooth dense film. The application technique and heating cycle required to cure the resin comprise spraying the liquid formulation on the substrate with an airbrush and then curing the applied film in an air-circulating oven. Brush application or dipping the substrate in the liquid formulation may also be employed.

The procedure followed to prepare a film for application, for spraying onto a substrate, and for curing is as follows:

(1) Desired quantities of resin, $MoS_2$ (microsize) and antimony trioxide (chemically pure 200 mesh powder) are measured out for mixing.

(2) The resin is poured into a mixing container (a modified vacuum flask) and diluted by mixing ten parts of the preferred solvent to one part resin.

(3) Next, $MoS_2$ and $Sb_2O_3$ are added to the mixing container.

(4) One drop of a leveling agent, Modaflow, manufactured by Monsanto Chemical Company, is then added for each gram of resin used.

(5) The film ingredients are mixed with a high speed food blender for approximately 5 to 10 minutes before spraying. The mixture is sprayed onto a metallic substrate with an airbrush to a thickness of approximately 0.0005 in. (Thicknesses less than about 0.0001 in. would be insufficient to prevent interference by the surface roughness of the substrate, while thicknesses greater than about 0.0006 in. would tend to flake off.) Nitrogen is used with the airbrush instead of air to avoid contaminants present in plant air.

(6) The films are cured by air-drying for about ten minutes and then are baked in an air circulating oven for about one hour at 200° F. to evaporate the solvent and for an additional hour or so at 575° F. to cause ring closure to occur.

Wear-life tests of the films have been made on a Falex tester in air at room temperature with no external heating or cooling in order to determine the effect of formulation changes. The data set forth hereinafter were collected with two standard Falex testers equipped with automatic cutoffs. A sketch of the test configuration for the Falex ester is shown in FIG. 1. In this machine two V-blocks 10 and 12 are loaded against a rotating ¼ in. diameter pin 14. Both the pin 14 and V-blocks 10 and 12 are coated with the solid lubricant film to present coated bearing components. The pins are preferably made of AISI 3135 steel hardened to a Rockwell B of 85 to 90. The V-block material was AISI 1137 steel hardened to a Rockwell C of 20 to 24. All wear-life tests were run at 290 r.p.m. (19 f.p.m.). The loading consisted of running at 300 pounds for 3 minutes, 500 pounds for 1 minute, 750 pounds for one minute, and then at 1,000 pounds until the film failed. Pin rotation was started before applying any load; increases in load were made, while running, with a ratchet device on the Falex tester. Film failure was sensed by an increase in frictional torque of 5 in.-lb. above the steady state value run-in (usually 2–5 in.-lb.).

The optimum ratio of $MoS_2$ to $Sb_2O_3$ in MDA polyimide was determined by maintaining a 2:1 lubricant-to-binder ratio in the film while varying the ratio of $MoS_2$ to $Sb_2O_3$. A plot of test results of a series of tests for this step are shown by the line 16 in FIG. 3 wherein percent by weight $MoS_2$ in the lubricant (remainder $Sb_2O_3$) is plotted against wear-life in minutes on the Falex tester. The ratio of $MoS_2$ to $Sb_2O_3$ which favors the longest wear-life is 3:1 by weight (three parts $MoS_2$ to one part $Sb_2O_3$).

In then determining the lubricant-to-binder ratio which gives the longest wear-life using the ratio of $MoS_2$ to $Sb_2O_3$ of 3:1, tests were run as illustrated by the line 18 in FIG. 2 wherein percent by weight binder (remainder lubricant) is plotted against Falex wear-life in minutes. It can be seen that the lubricant-to-binder ratio of approximately 79:21 by weight (79 percent lubricant and 21 percent binder), which is approximately 1:1 by volume, gives the longest wear-life. This particular film is referred to hereinafter as MLR-1.

The results for the solid lubricant film bonded with DADPE polyimide are illustrated in lines 20 and 22 of FIGS. 3 and 2 respectively where it can be seen that a weight ratio of approximately 55 percent $MoS_2$ to 45 percent $Sb_2O_3$ is optimum in the lubricant and a weight ratio of about 34 percent polyimide binder to 66 percent lubricant is optimum for the film. Such optimized film is referred to hereinafter as MLR-2.

The tables to follow comprise wear-life data on four films, MLR-1, MLR-2, MLF-5, and MLF-9. MLF-5 is composed of $MoS_2$+graphite+gold and sodium silicate in the weight ratio of 10:1:5/7. MLF-9 is composed of $MoS_2$+graphite+bismuth and monoaluminum phosphate in the weight ratio of 10:1:14/10. The tabular data thus provide a comparison between the polyimide bonded films and inorganic (sodium silicate and aluminum phosphate) bonded films.

Three testers were utilized for collection of wear-life data, namely: a high temperature Falex machine and two dual rub shoe machines. The high temperature Falex machine utilizes the same specimen configuration as the standard Falex tester; otherwise, it is completely different. The V-blocks are loaded against the pin with a weight lever system and the pin may be driven up to 170 r.p.m. with a variable speed hydraulic transmission. Frictional torque is resisted by a pendulum system. An electric oven suitable for operation to 1700° F. is positioned around the specimens. This machine, like the standard Falex testers, has been equipped with an automatic shutoff device. In operation, the pin rotation is started at no load and 100 lb. step loads are applied on one minute intervals. Film failure is sensed by an increase in frictional torque of 10 in.-lb. over the stabilized running torque (4–10 in.-lb.).

One of the dual rub shoe machines is referred to as the Hohman A-3 and the other as the Mark V. Both of these machines use a specimen configuration consisting of two opposed ¼ in. wide rub shoes loaded against a 1⅜ in. diameter rotating lubricated disc. The Hohman A-3 machine has the rotating disc mounted on a horizontal shaft, and the other, the Mark V machine, has the disc mounted on a vertical shaft. The Hohman A-3 operates at room temperature and pressure. The Mark V has heaters capable of 1000° F. or more, and a vacuum system capable of evacuating to pressures of $10^{-7}$ torr or less. Both machines use a weighted lever loading system. During runs with each machine frictional torque is normally recorded continuously. Film failure is indicated by a change in frictional torque of three to five times the stabilized running torque. Frictional torque on the Hohman A-3 is sensed from the frictional force transmitted from the rotating ring to the stationary rub shoes. In the Mark V, frictional torque is determined from the reaction torque on the drive motor. In operation, both machines are started with no load on the specimen; however, the load is gradually applied during the first 25 to 50 revolutions of the test.

A series of tests were run on the high-temperature Falex machine and the Mark V dual rub shoe machine to determine the effect of temperature on the wear-life of MLR-1 and MLR-2. Identical tests were made on MLF-5 and MLF-9 for comparative purposes. Tests on the Falex high-temperature machine were run in air at 80 lb. load (220,000 p.s.i.—maximum Hertzian contact stress for the test specimens neglecting the effect of the lubricant film), 100 r.p.m. (6.5 f.p.m.) and at 200°, 300°, 400°, 500°, and 600° F. Five runs were made at each set of test conditions. Standard Falex specimens (AISI 3135 pins hardened to Rb 85–90 and AISI 1137 V-blocks hardened to Rc 20–24) were used for the first three temperatures. At 500° F., 440C stainless steel pins and V-blocks hardened to Rc 55–60 were used and at 600° F. AISI 4340 pins and V-blocks hardened to Rc 50–55 were used. All the wear-life data collected from the tests on the high-temperature Falex machine are presented in Table I.

TABLE I.—WEAR-LIFE ON HIGH TEMPERATURE FALEX MACHINE (MINUTES)

| | Solid film lubricants | | | |
| --- | --- | --- | --- | --- |
| | MLF-5 | MIL-9 | MLR-1 | MLR-2 |
| Temp., 200° F | 40 | 231 | 244 | 1,038 |
| | 53 | 102 | 430 | 662 |
| | 88 | 303 | 471 | 480 |
| | 25 | 105 | 290 | |
| | 60 | 147 | | |
| Average life | 53 | 177.6 | 359 | 726 |
| Temp., 300° F | 41 | 85 | 272 | 607 |
| | 28 | 84 | 355 | 890 |
| | 27 | 281 | 261 | 550 |
| | 58 | 235 | 198 | |
| | 27 | 162 | | |
| Average life | 36 | 169.6 | 271.5 | 682 |
| Temp., 400° F | 42 | 203 | 174 | 258 |
| | 24 | 195 | 244 | 270 |
| | 53 | 63 | 172 | 259 |
| | 50 | 186 | 123 | 255 |
| | 27 | | 172 | 245 |
| Average life | 39 | 162 | 187 | 257 |
| Temp., 500° F | 24 | 68 | 168 | 228 |
| | 24 | 47 | 145 | 325 |
| | 23 | 100 | 125 | 213 |
| | 32 | 126 | 157 | 350 |
| | 31 | 56 | 82 | 460 |
| | | | | 190 |
| | | | | 290 |
| Average life | 27 | 79.4 | 135 | 294 |
| Temp., 600° F | 16 | 65 | 63 | 122 |
| | 14 | 64 | 67 | 100 |
| | 15 | 49 | 88 | 149 |
| | 21 | 62 | 91 | 171 |
| | 14 | 59 | 106 | 129 |
| Average life | 16 | 59.8 | 83 | 134 |

The elevated temperature tests conducted on the Mark V dual rub shoe machine were run in air at 100 lb. load (62,000 p.s.i.—maximum Hertzian contact stress for the test specimens neglecting the effect of the lubricant film), 400 r.p.m. (144 f.p.m.), and 200°, 300°, 400°, 500°, 600°, and 700 F. Two tests were conducted at each set of conditions. The ring and shoe specimens for all tests conducted on the dual rub shoe machine were made of 440C stainless steel and hardened to a Rc 55 to 60. Only the ring was coated with lubricant. The rub shoe was ground to a surface finish of 8–10 microinches RMS.

Results of these tests conducted on the Mark V machine are shown in Table II.

TABLE II.—SOLID LUBRICANT FILM WEAR-LIFE AT VARIOUS TEMPERATURES ON MARK V DUAL RUB SHOE MACHINE

| Film | Temp., °F. | Wear-life (load cycles) | | |
|---|---|---|---|---|
| | | Run 1 | Run 2 | Average |
| MLF-5 | 200 | 163,200 | 214,400 | 188,800 |
| | 300 | 121,840 | 141,600 | 131,720 |
| | 400 | 106,400 | 132,000 | 119,200 |
| | 500 | 64,000 | 58,400 | 61,200 |
| | 600 | 20,000 | | 20,000 |
| | 700 | 9,120 | | 9,120 |
| MLF-9 | 200 | 107,600 | 102,720 | 105,160 |
| | 300 | 61,200 | 62,800 | 62,000 |
| | 400 | 82,400 | 65,600 | 74,000 |
| | 500 | 64,800 | 74,400 | 69,600 |
| | 600 | 41,600 | | 41,600 |
| | 700 | 22,400 | | 22,400 |
| | 800 | 5,360 | | 5,360 |
| MLR-1 | 150 | 288,000 | 513,600 | 400,800 |
| | 200 | 297,600 | 276,000 | 286,800 |
| | 300 | 269,600 | 184,000 | 226,800 |
| | 400 | 76,800 | 68,800 | 72,800 |
| | 500 | 76,800 | 40,000 | 58,400 |
| | 600 | 12,000 | | 12,000 |
| MLR-2 | 150 | 2,844,000 | 4,484,000 | 3,664,000 |
| | 225 | 4,083,200 | 535,200 | 2,309,200 |
| | 300 | 300,800 | 378,400 | 339,600 |
| | 400 | 197,600 | 256,000 | 226,800 |
| | 500 | 73,600 | 80,000 | 76,800 |
| | 600 | 26,400 | 26,400 | 26,400 |
| | 700 | 6,160 | | 6,160 |

Another series of tests were run on the Hohman A-3 dual rub shoe machine to determine the effect of load on these films. These tests were run in air at room temperature (specimen temperature would be higher because of frictional heat), 220 r.p.m. (79.2 f.p.m.), and loads of 110 180, 240, 300 and 350 lb. Results obtained for this series of tests are presented in Table III.

TABLE III.—SOLID LUBRICANT FILM WEAR-LIFE AT VARIOUS LOADS ON HOHMAN A-3 DUAL RUB SHOE MACHINE

| Film | Load, lb. | Wear-life (load cycles) | | |
|---|---|---|---|---|
| | | Run 1 | Run 2 | Average |
| MLF-5 | 110 | 255,516 | 284,522 | 270,019 |
| | 180 | 155,314 | 159,824 | 157,569 |
| | 240 | 96,082 | 92,592 | 94,337 |
| | 300 | 55,242 | 79,956 | 67,599 |
| | 350 | 53,492 | 46,072 | 49,782 |
| MLF-9 | 110 | 211,052 | 267,926 | 239,489 |
| | 180 | 139,048 | 134,236 | 135,642 |
| | 240 | 75,936 | 103,816 | 89,876 |
| | 300 | 45,538 | 53,376 | 49,457 |
| | 350 | 38,768 | 50,052 | 44,413 |
| MLR-1 | 110 | 256,174 | 283,430 | 269,802 |
| | 180 | 149,428 | 124,678 | 137,052 |
| | 240 | 83,808 | 85,692 | 84,750 |
| | 300 | 89,666 | 88,824 | 89,245 |
| | 350 | 67,388 | 66,570 | 66,979 |
| MLR-2 | 110 | 936,060 | 1,033,292 | 984,676 |
| | 180 | 824,970 | 668,908 | 746,939 |
| | 240 | 354,440 | 454,602 | 404,521 |
| | 300 | 160,072 | 259,348 | 209,710 |
| | 350 | 195,010 | 97,916 | 146,463 |

In addition to the data presented in Tables I, II and III, a limited number of runs were conducted in vacuum of approximately $5 \times 10^{-6}$ torr with MLR-1 and MLR-2 on the Mark V rub shoe machine at 400 r.p.m. and 100 lb. load. Results obtained for both lubricants indicate that they have usable wear-life capabilities in vacuum at 1000° F.; the average wear-life for three tests was 15,000 and 30,000 load cycles for MLR-1 and MLR-2 respectively.

The optimum formulations discused above may be applied to bearing components by using the procedure which was used for preparing the test samples as outlined above. For example, referring to FIG. 6, a bearing assembly 24 includes an inner race component 26, an outer race component 28, a plurality of ball bearing components 30 and a bearing retainer ring component 32. The race components 26 and 28 each have a channel or track 34 for guiding the bearing components 30 as the race components 26 and 28 are rotated relatively. The surfaces presented by tracks 34 are coated with a polyimide bonded solid film lubricant and the ball bearing components 30 are lubricated by a transfer film from tracks 34.

The use of a porous material for race components 26 and 28 renders additional lubrication possible by pressure or vacuum impregnation of the material with the polyimide bonded solid film lubricant in its liquid, uncured state. After impregnation, the material is heated to effect curing, whereupon it then forms the substrate for the polyimide film, as discussed hereinabove. Suitable materials include porous bronze, brass, molybdenum, sintered iron or sintered ceramics.

Alternatively, the retainer ring component 32 may be constructed of a solid lubricant in order to lubricate the ball bearing components 30 by film transfer. However, solid lubricants do not generally have substantial structural strength. To this end, component 32 may be constructed by use of the procedure illustrated in FIG. 4 so that the same will have solid lubricant characteristics as well as structural strength. An elongated, cloth-like element 36 of fiber glass is passed between a pair of rollers 38 and is coated with a liquified solid lubricant formulation such as the above described formulations at a spraying station 40. The coated element then passes through a heating zone 42 where the formulation is heated sufficiently to drive off at least a portion of the solvent and render the formulation tacky. The element 36 with the tacky formulation thereon is then coiled or wrapped around a mandrel 44 while the rollers 38 retard the motion of the element 36 to maintain the latter in tension as it is coiled tightly about mandrel 44. When a sufficient number of loops of element 36 have been wound about mandrel 44 to produce the desired thickness, the element 36 is severed to present a tubular bearing component 46 which is also shown in perspective in FIG. 5.

The element 36 in the component 46 extends circumferentially thereof in a continuous spiral. Manifestly, as each layer of coated element is wrapped onto the mandrel in superimposed relationship with respect to previously coiled layers, the tacky formulation thereon merges with the underlying tacky formulation and the formulation becomes radially continuous. Thus, upon baking of the component at 200° F. to evaporate any remaining solvent and curing the same at 575° F. to cause ring closure to occur, the formulation becomes a solid body having the element 36 extending circumferentially therein and spirally therearound. The cured tubular component 46 is suitable for machining to present a ball bearing retainer such as the retainer component 32, to present a bearing sleeve, or to present similar bearing components.

Alternatively, element 36 may comprise a single fiber or multifibrous stand of fiber glass rather than a glass cloth as described above. The method utilized to form a tubular component such as illustrated in FIG. 5 is the same as above, with the addition of longitudinal, back-and-forth movement of element 36 along mandrel 44 during the coiling operation.

The end product to be ultimately utilized in a bearing assembly or other antifriction application may have any of a number of shapes other than the tubular configuration of bearing component 46. For example, bearing blocks may be cut from component 46 utilizing the latter as stock. Regardless of the ultimate shape, it may be appreciated that the antifriction product will have structural strength in addition to solid lubricant characteristics due to the laminated fiber glass reinforcing structure provided within the polyimide body.

The tubular component 46 is also adapted for forming by vacuum impregnation of element 36 with the liquified polyimide formulation after the element is wound upon mandrel 44. This would be effected by inserting the mandrel, with element 36 wound thereon, into a tube having an inside diameter substantially the same (with adequate clearance) as the outside diameter of the mandrel and the layers of element 36 combined. With one end of the mandrel and tube immersed in the liquid formulation, a vacuum is drawn at the annulus presented by the mandrel and the tube at the opposite end thereof, resulting in the establishment of flow of the formulation longitudinally of the mandrel and tube between the same. The formulation would thus be forced to flow between the various fiber glass layers of element 36 to effect the desired impregnation thereof.

Referring to FIG. 7, a segment 48 of a shaft is illustrated in longitudinal cross section. To form a part of a journal for the shaft or for other antifriction purposes, a polyimide solid lubricant body 50 in the form of a sleeve is bonded to the underlying surface 52 of shaft segment 48. It should be understood that the illustration of shaft segment 48 as the substrate is exemplary only, in that body 50, with an appropriate change in shape, could be bonded to members of various configurations which are to be subjected to sliding or rolling friction.

The sleeve body 50 is reinforced by a fiber glass cloth 54 which extends circumferentially of body 50 therewithin. The sleeve is applied to shaft segment 48 while the polyimide composition is in the liquid state, such as by saturating the glass cloth 54 with the liquid formulation, placing the same in surrounding relationshihp to shaft segment 48, preferably while the formulation is in a tacky condition, and then curing is effected to bond sleeve body 50 to the underlying surface 52.

It will be appreciated from the foregoing that the polyimide binder of the instant invention, with respect to fiber glass reinforced bearing components, unites the layers of the fiber glass cloth or strand to form a laminated reinforcing structure, in addition to serving as the binder for the solid lubricant pigment. Thus, an additional resin binder for the reinforcing structure is not required and, in the embodiment illustrated in FIG. 7, the binder also adheres the solid lubricant body to the underlying substrate.

Manifestly, as is illustrated in Tables I, II and III, the polyimide bonded solid lubricants produced and utilized in accordance with the principles and concepts of the instant invention have substantially greater wear-life characteristics than inorganic bonded solid lubricants. Furthermore, such polyimide bonded lubricants have much greater resistance to the effects of high temperatures and high vacuums than conventional resin bonded solid lubricants. Thus, bearing components provided with a polyimide bonded solid lubricant are suitable for use over extended periods of time and under extremely adverse operating conditions.

Having thus described the invention, what is claimed as new and desired to be secured by Letters Patent is:

1. In a bearing assembly:
a bearing component presenting a bearing surface; and
a solid film lubricant on said surface, said lubricant comprising:
a layer of an aromatic, cured polyimide composition disposed in adhering relationship to said surface and characterized by the property of resisting thermal degradation at useful temperatures of at least 600° F.,
said layer having a thickness of approximately 0.0001 to 0.0006 inch, and
a finely divided, solid phase lubricating material dispersed throughout said composition,
said material and said composition being present in said lubricant in major and minor proportions by weight respectively.

2. The invention of claim 1:
said component being porous,
there being a polyimide composition impregnated in said component; and
a finely divided, solid phase lubricating material dispersed throughout the composition in said component.

3. The invention of claim 1, wherein said composition comprises a polypyromellitimide characterized by the property of having been derived from the reactions between pyromellitic dianhydride and an aromatic diamine.

4. The invention of claim 3, wherein said diamine comprises 4,4'-methylene dianiline.

5. The invention of claim 3, wherein said diamine comprises 4,4'-diaminodiphenyl ether.

6. The invention of claim 3, wherein said material comprises a soft metal powder.

7. The invention of claim 3, wherein said material comprises a tetrafluoroethylene resin.

8. The invention of claim 3, wherein said material comprises molybdenum disulfide.

9. The invention of claim 3, wherein said material comprises tungsten disulfide.

10. The invention of claim 3, wherein said material comprises an admixture of molybdenum disulfide and antimony trioxide.

11. The invention of claim 10, wherein said diamine comprises 4,4'-diaminodiphenyl ether.

12. The invention of claim 11, wherein the weight ratio of material to composition in said lubricant is in the range of approximately 1½:1 to 4:1.

13. The invention of claim 12, wherein said admixture comprises approximately 40 to 70 percent of said molybdenum disulfide and 60 to 30 percent of said antimony trioxide.

14. The invention of claim 10, wherein said diamine comprises 4,4'-methylene dianiline.

15. The invention of claim 14, wherein the weight ratio of material to composition in said lubricant is in the range of approximately 3:1 to 7:1.

16. The invention of claim 15, wherein said admixture comprises approximately 60 to 90 percent of said molybdenum disulfide and 40 to 10 percent of said antimony trioxide.

References Cited

UNITED STATES PATENTS

| | | | |
|---|---|---|---|
| 2,813,041 | 11/1957 | Mitchell et al. | 308—241X |
| 2,901,380 | 8/1959 | Crump | 308—241X |
| 2,944,993 | 7/1960 | Brebner et al. | 260—78X |
| 3,001,837 | 9/1961 | Lamson et al. | 308—241X |
| 3,151,015 | 9/1964 | Griffith | 161—158 |
| 3,179,631 | 4/1965 | Endrey | 260—37X |
| 3,179,634 | 4/1965 | Edwards | 260—78 |
| 3,242,076 | 3/1966 | Hagan | 252—12X |
| 3,277,043 | 10/1966 | Holub | 260—78X |
| 3,453,208 | 7/1969 | Gallagher et al. | 252—12 |

ROBERT F. BURNETT, Primary Examiner

W. A. POWELL, Assistant Examiner

U.S. Cl. X.R.

117—132, 161; 156—184; 161—93, 162, 189, 227; 252—12.4; 308—188, 238, 240